United States Patent
Ye et al.

(10) Patent No.: US 7,764,727 B2
(45) Date of Patent: Jul. 27, 2010

(54) SELECTING MCS IN A MIMO SYSTEM

(75) Inventors: Huanchun Ye, Santa Clara, CA (US);
Won-Joon Choi, Santa Clara, CA (US);
Ning Zhang, Santa Clara, CA (US);
Jeffrey M. Gilbert, Santa Clara, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 854 days.

(21) Appl. No.: 11/329,978

(22) Filed: Jan. 10, 2006

(65) Prior Publication Data
US 2007/0206695 A1 Sep. 6, 2007

Related U.S. Application Data

(60) Provisional application No. 60/643,461, filed on Jan. 12, 2005.

(51) Int. Cl.
*H04B 1/00* (2006.01)
(52) U.S. Cl. .................. 375/150; 332/103; 340/870.18; 340/538.11; 375/E7.21; 375/261; 375/298; 700/53
(58) Field of Classification Search ................. 370/335, 370/338; 375/150, 261, 265, 267, 343; 455/13.4
See application file for complete search history.

(56) References Cited

U.S. PATENT DOCUMENTS

| | | | |
|---|---|---|---|
| 5,490,165 A | 2/1996 | Blakeney, II et al. | |
| 5,659,578 A | 8/1997 | Alamouti et al. | |
| 6,298,092 B1 * | 10/2001 | Heath et al. | 375/267 |
| 2002/0090035 A1 | 7/2002 | Seshadri et al. | |
| 2002/0150182 A1 | 10/2002 | Dogan et al. | |
| 2003/0129943 A1 * | 7/2003 | Park et al. | 455/13.4 |
| 2004/0114560 A1 * | 6/2004 | Jacobsen | 370/338 |
| 2006/0072524 A1 * | 4/2006 | Perahia et al. | 370/338 |

OTHER PUBLICATIONS

Horng et al. "Throughput Analysis for W-CDMA System with MIMO and AMC", Mitsubishi Electric Information Technology Center America, May 2003, 7 pages.

* cited by examiner

*Primary Examiner*—David C Payne
*Assistant Examiner*—Adolf Dsouza
(74) *Attorney, Agent, or Firm*—Bever, Hoffman & Harms, LLP; Jeanette S. Harms

(57) ABSTRACT

An accurate total error rate performance can be measured using a computed error vector magnitude (EVM) per stream. Using this EVM, the receiver or the transmitter can advantageously generate an optimized modulation and coding scheme (MCS) that corresponds to a specific number of streams, modulation and coding rate for the transmitter. For example, the receiver can compute an SNR from the EVM and then use an SNR vs. MCS table to determine the optimized MCS. In contrast, the transmitter can receive an EVM-to-RSSI mapping and an EVM-to-MCS mapping from the receiver. These mappings and an EVM can facilitate selecting the optimized MCS.

15 Claims, 7 Drawing Sheets

| Number_of_tx_chains x Number_of_rx_chains | Bandwidth (MHz) | Number Of Streams | SNR (dB) for MCS1/ MCS7 | SNR (dB) for MCS1/ MCS8 | SNR (dB) for MCS2/ MCS10 | SNR (dB) for MCS3/ MCS11 | SNR (dB) for MCS4/ MCS12 | SNR (dB) for MCS5/ MCS13 | SNR (dB) for MCS6/ MCS14 | SNR (dB) for MCS7/ MCS15 |
|---|---|---|---|---|---|---|---|---|---|---|
| 1 x 1 | 20 | 1 | 3 | 7 | 9 | 13 | 16 | 21 | 22 | 24 |
| 1 x 1 | 40 | 1 | 4 | 7 | 9 | 13 | 17 | 21 | 22 | 24 |
| 1 x 2 | 20 | 1 | 2 | 4 | 7 | 10 | 14 | 18 | 19 | 21 |
| 1 x 2 | 40 | 1 | 2 | 4 | 6 | 10 | 14 | 18 | 19 | 20 |
| 2 x 2 | 20 | 2 | 3 | 4 | 6 | 10 | 14 | 18 | 19 | 21 |
| 2 x 2 | 20 | 1 | 4 | 6 | 9 | 12 | 16 | 21 | 22 | 23 |
| 2 x 2 | 40 | 2 | 2 | 4 | 6 | 11 | 14 | 17 | 19 | 21 |
| 2 x 2 | 40 | 1 | 3 | 6 | 9 | 12 | 16 | 20 | 22 | 24 |
| 3 x 3 | 20 | 2 | 2 | 3 | 5 | 9 | 12 | 16 | 18 | 19 |
| 3 x 3 | 20 | 1 | 3 | 5 | 8 | 10 | 14 | 18 | 20 | 22 |
| 3 x 3 | 40 | 1 | 2 | 3 | 5 | 9 | 12 | 16 | 17 | 19 |
| 3 x 3 | 40 | 2 | 2 | 5 | 7 | 11 | 14 | 18 | 20 | 21 |

Figure 4B

SELECTING MCS IN A MIMO SYSTEM

RELATED APPLICATION

The present application claims priority to provisional application 60/643,461, entitled "Rate Adaptation Using Closed Loop Techniques, and filed on Jan. 12, 2005.

BACKGROUND OF THE INVENTION

1. Field of the Invention

A method for selecting a modulation and coding rate scheme (MCS) in a multiple-in multiple-out (MIMO) system is provided.

2. Related Art

The design of communication systems for wireless local area networks (WLANs) is based on a family of standards described in IEEE 802.11. To address multipath and, more particularly, the fading caused by multipath (wherein objects in the environment can reflect a transmitted wireless signal) and other conditions, a wireless system can employ various techniques. One such technique is configuring the WLAN as a multiple-input multiple-output (MIMO) system.

FIG. 1 illustrates a simplified MIMO system 100, which can transmit on multiple antennas simultaneously and receive on multiple antennas simultaneously. Specifically, a transmitter (Tx) 101 can transmit signals simultaneously from antenna 102A (using a transmitter chain 103A) and from antenna 102B (using a transmitter chain 103B). Similarly, a receiver (Rx) 104 can receive signals simultaneously from antenna 105A (using a receiver chain 106A) and from antenna 105B (using a receiver chain 106B). The use of multiple antennas, depending on the specific implementation, can either extend the range or increase the data rate at a given range. Note that multiple streams of data can also be sent using the multiple antennas. MIMO system 100 can also advantageously minimize the differences in signal to noise ratio (SNR) across different frequency bins.

In the IEEE 802.11a/g standards, the sub-carriers of the channel associated with an OFDM-encoded signal may be modulated using a different modulation. Exemplary modulations include binary phase-shift keying (BPSK), quadrature phase-shift keying (QPSK), 16 quadrature amplitude modulation (QAM), 64 QAM, etc.

Adding redundancy to the signal using convolutional coding, simply referenced herein as coding, can also be used to increase the probability of accurate signal reception. The coding rate is a ratio of the number of transmitted bits to the number of actual data bits to be transmitted. For example, a coding rate of ½ refers to transmitting 2 bits for every 1 actual data bit. The tightest coding rate is currently ⅚ in which 6 bits are transmitted for every 5 data bits.

Notably, in conformance with the 802.11 standards, each modulation can have a predetermined coding rate. For example, Table 1 lists various modulations and their associated coding rates as provided in the 802.11a 1999 standard.

TABLE 1

MODULATION AND CODING RATES

| Data rate (Mbits/s) | Modulation | Coding rate | Coded bits per subcarrier | Coded bits per OFDM symbol | Data bits per OFDM symbol |
|---|---|---|---|---|---|
| 6 | BPSK | ½ | 1 | 48 | 24 |
| 9 | BPSK | ¾ | 1 | 48 | 36 |
| 12 | QPSK | ½ | 2 | 96 | 48 |
| 18 | QPSK | ¾ | 2 | 96 | 72 |
| 24 | 16-QAM | ½ | 4 | 192 | 96 |
| 36 | 16-QAM | ¾ | 4 | 192 | 144 |
| 48 | 64-QAM | ⅔ | 6 | 288 | 192 |
| 54 | 64-QAM | ¾ | 6 | 288 | 216 |

In a standard MIMO system, a single or multiple data stream can be transmitted. The number of streams, the modulation, and coding rate scheme (MCS) can be set based on the channel condition. An overall indicator of the channel condition is the received signal strength indicator (RSSI). This RSSI can be used to compute a bit error rate, thereby allowing at least an informed MCS selection.

Note that random bit errors can occur because of white Gaussian noise. These bit errors can be easily corrected using convolutional coding. Unfortunately, the bit error rate is only one element of the total packet error rate performance. Specifically, the bit error rate does not include burst errors. Burst errors can occur because of fading or strong interfering signals. These burst errors include a large number of errors within a short period of time and therefore cannot be easily corrected using convolutional coding.

Thus, a standard RSSI measurement is not sufficient to accurately measure how well a packet of information can be successfully transmitted using a given MCS. Therefore, a need arises for an accurate measure of total error rate performance, wherein using the accurate measure of total error rate performance can then result in an optimized MCS selection.

BRIEF DESCRIPTION OF THE FIGURES

FIG. 4B illustrates an exemplary SNR vs. MCS table that could be used in the technique of FIG. 4A.

SUMMARY OF THE INVENTION

Figure 1:
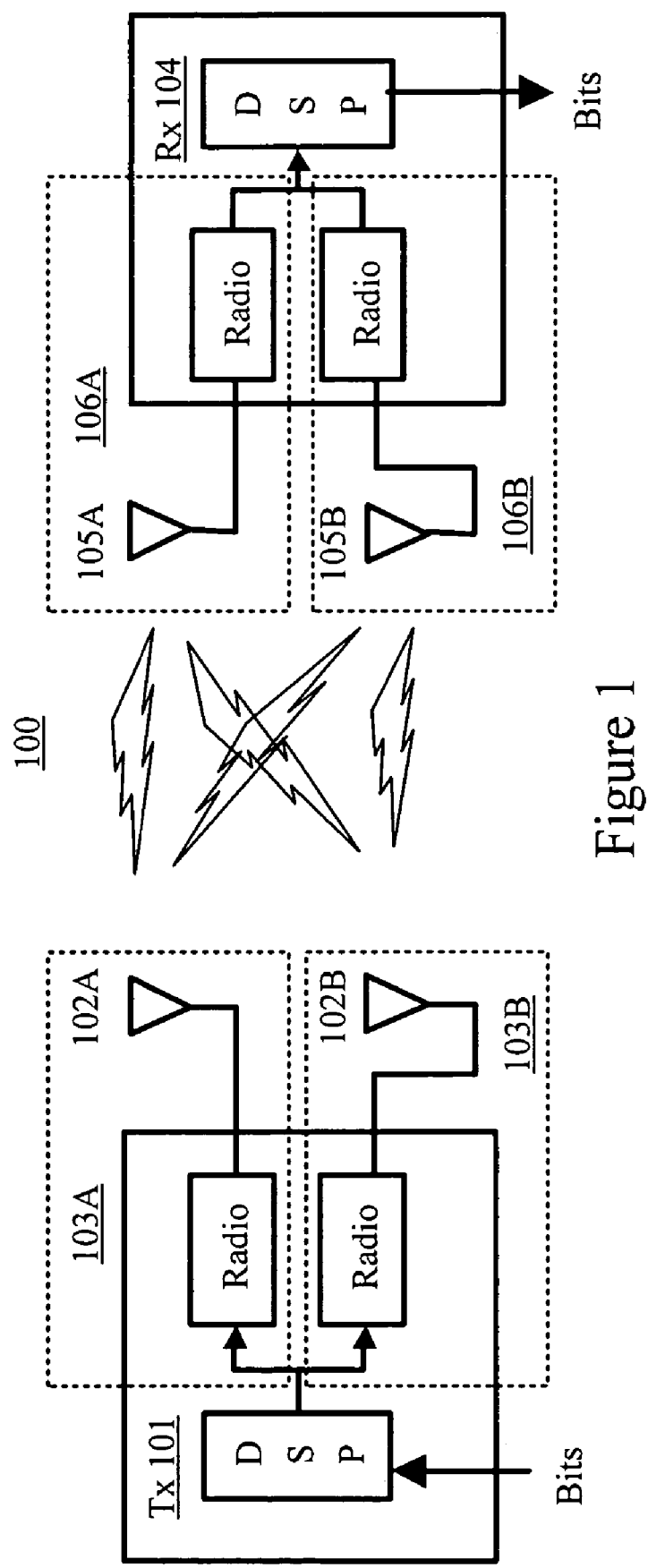
FIG. 1 illustrates a simplified multiple-input multiple-output (MIMO) system.

A standard RSSI measurement is not sufficient to accurately measure how well a packet of information can be successfully transmitted using a given number of streams, modulation, and coding rate scheme (MCS). In accordance with one aspect of the invention, an accurate measure of total error rate performance is computed. This accurate measure of total error rate performance can be advantageously used to ensure a highly optimized MCS selection. This MCS selection can be performed by the receiver or the transmitter, as described below in further detail.

A method for a receiver in a wireless system to optimize a determination of a MCS for a transmitter in the wireless system is provided. In this method, the receiver can receive generic mapping information of selected transmit power vs. modulation from the transmitter in a message. Each selected transmit power is, for a given modulation, able to meet the transmitter distortion requirement. The receiver can compute an average error vector magnitude (EVM) from the message (per stream, if multiple streams are used). Using this EVM, the receiver can then calculate a signal to noise ratio (SNR).

Using this SNR, the receiver can then predict the SNRs for various MCSs based on the transmit power vs. modulation information. At this point, the receiver can use these SNRs and an SNR vs. MCS table to determine an optimized MCS for the transmitter. Note that each MCS in the SNR vs. MCS table actually corresponds to a data rate, wherein each data rate then has an associated number of streams, and a modulation and coding rate scheme as prescribed by 802.11. Note that the SNR value is the SNR required to decode the associated MCS reliably. In one embodiment, the SNR vs. MCS table can be pre-stored based on simulation or lab bench testing. In one embodiment, the SNR vs. MCS table can be dynamically adjusted using, for example, historical success rates based on SNRs.

Another method for a receiver in a wireless system to optimize a determination of number of streams, a modulation and coding rate scheme (MCS) for a transmitter in the wireless system is provided. In this method, the receiver can receive generic mapping information of selected transmit power vs. modulation from the transmitter in a message. Each selected transmit power is, at a given modulation, able to meet a distortion requirement. The receiver can further receive an EVM per stream computed by the transmitter and sent in the message.

At this point, the receiver can use the EVM to calculate an SNR. Using this SNR, the receiver can then predict the SNRs for various MCSs based on the transmit power vs. modulation information. At this point, the receiver can determine an optimized MCS for the transmitter using the SNR vs. MCS table. In one embodiment, the SNR vs. MCS table can be dynamically adjustable using, for example, historical success rates based on SNRs.

A method for a transmitter in a wireless system to optimize a determination of an MCS for itself in the wireless system is provided. In this method, the transmitter can receive an EVM per stream from the receiver in the message. The transmitter can further receive generic mapping information from the receiver in a message. The generic mapping information can include an EVM-to-RSSI mapping and an EVM-to-MCS mapping.

Using the EVM and the EVM-to-RSSI mapping, the transmitter can calculate an RSSI at the receiver. Then, using the RSSI and a selected transmitter power, the transmitter can predict EVMs at the receiver for various MCSs. At this point, the transmitter can use the EVM-to-MCS mapping to select an optimized MCS for itself.

Notably, by starting with an accurate total error rate performance value, i.e. the EVM, subsequent computations can advantageously generate very accurate values for the SNR and the RSSI. These accurate values can, in turn, lead to a highly optimized selection for the MCS.

Note that the above-described techniques can be advantageously implemented in software using computer-implemented instructions.

DETAILED DESCRIPTION OF THE FIGURES

In accordance with one aspect of the invention, an accurate total error rate performance can be measured using a computed error vector magnitude (EVM). Using this EVM, the receiver or the transmitter can advantageously select an optimized number of streams, modulation, and coding rate scheme (MCS) for the transmitter.

Figure 2:
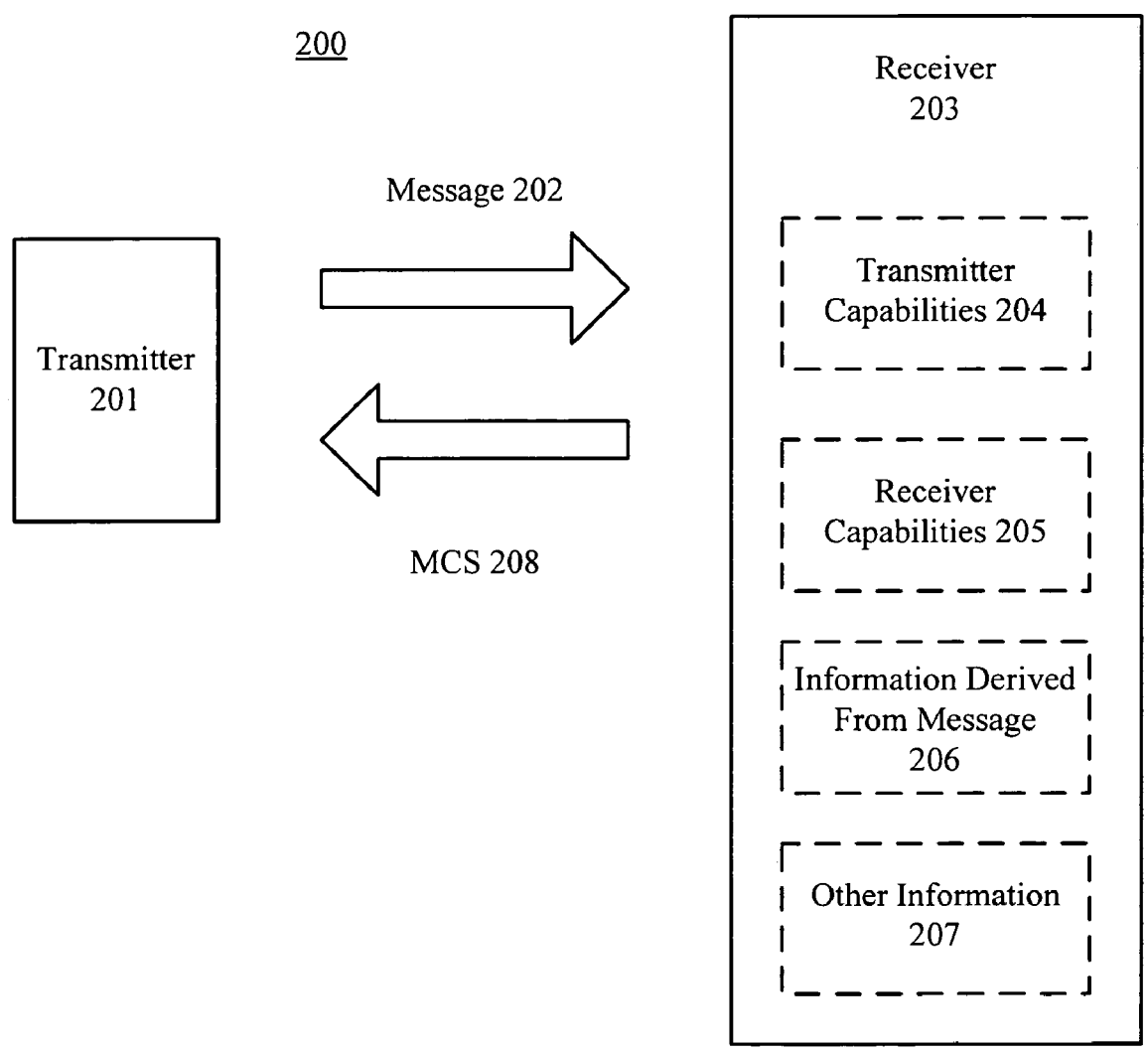
FIG. 2 illustrates a simplified wireless system in which a receiver can generate an optimized MCS for a transmitter.

FIG. 2 illustrates a simplified wireless system 200 in which a receiver 203 can select an optimized MCS 207 for a transmitter 201. In system 200, transmitter 201 can send a message 202 including transmitter capabilities 204, e.g. usable data rates, to receiver 203.

For clarification, the term "capability" can be defined as a mode of operation of which the device is physically capable. Thus, for example, a device may have the capability of transmitting/receiving using only a subset of the plurality of data rates permitted by the applicable 802.11 standard. This data rate, i.e. exemplary capability, is communicated to another device using a negotiated base rate (e.g. at 6 Mbps for 802.11a and 1 Mbps for 802.11g).

Note that message 202 can include one or more command packets (e.g. an RTS (request to send) packet) and/or one or more subsequent data packets. In either case, message 202 would include a preamble that includes training signals and data rate information. Message 202 can be sent at the lowest and thus most robust rate, thereby providing receiver 203 with advantageous conditions to compute MCS 208.

After receipt, receiver 203 can compute information derived from message 202, i.e. the error vector magnitude (EVM) per stream. Receiver 203 can use this derived information 206, transmitter capabilities 204, its own receiver capabilities 205, and other information 207 to determine the appropriate MCS for transmitter 201 to use under the circumstance.

In one embodiment, other information 207 can include, but is not limited to, interferences in the environment. For example, a channel might have a relatively low gain for desired information, e.g. a transmit to receive path might have a null at carrier 5 (that is, carrier 5 is normally weak when a signal is received). An interference coinciding with carrier 5 could result in carrier 5 suddenly having a lot of energy. Thus, although the interference does not describe the channel itself, the interference can describe an environment of carrier 5. Thus, any interference can significantly affect the choice of the optimized MCS.

Receiver 203 may feed back the result to transmitter 201 using various means. For example, to reduce the overhead of sending extra messages to provide the MCS information, yet ensure frequent updating, MCS 208 can be embedded in a control frame (e.g. an acknowledgement (ACK) packet) or a compound frame (e.g. a Data+CF-ACK packet) that is sent after an SIFS time.

Figure 3:
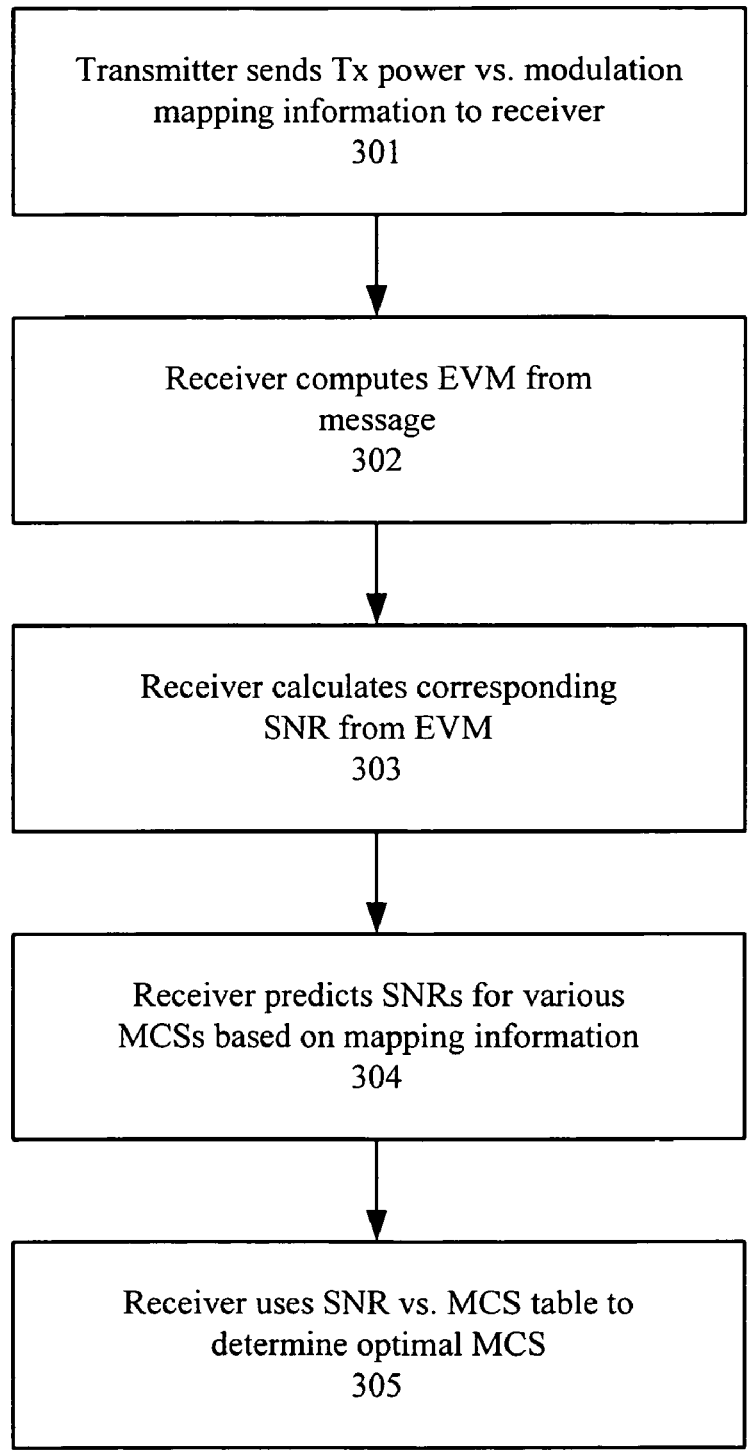
FIG. 3 illustrates an exemplary technique for the receiver to optimize a determination of the MCS.

FIG. 3 illustrates an exemplary technique 300 for the receiver to optimize a determination of the MCS. Note that the transmitter can turn down its power for more complex modulations to reduce distortion. That is, non-linearities of the power amplifier in the transmitter chain can distort a transmitted signal. This distortion increases proportionately with the power used to transmit the signal. Higher modulations have more restricted requirements on transmitter distortion. The transmitter can initially select a transmit power for a given modulation that is known to meet the distortion requirement. This initial transmit power is sometimes called a "back-off" power.

Using this initial transmit power in step 301, the transmitter can transmit generic mapping information of selected transmit power vs. modulation to a receiver. Notably, each selected transmit power is, at a given modulation, also able to meet a distortion requirement.

In step 302, the receiver can compute an error vector magnitude (EVM) from the message (per stream, if multiple streams are used). Note that the EVM can advantageously assess the quality of digitally modulated signals by determining how close the actual receiving signals are to optimized constellation positions consistent with the applicable modulation. In other words, the EVM can be defined as the difference between the expected complex value of a demodulated symbol and the value of the actual received symbol. Therefore, the EVM may include both amplitude and phase error information.

In step 303, the receiver can use the EVM to calculate the signal to noise ratio (SNR). Specifically, the SNR is the signal power over the noise power, i.e. signal power/(error magnitude)$^2$. Using this SNR, the receiver can then predict the SNRs for various MCSs in step 304 based on the generic transmit power vs. modulation information.

At this point, the receiver can determine the optimized MCS based on an SNR vs. MCS table in step 305.

In one embodiment, the SNR vs. MCS table can be dynamically adjusted based on other information. For example, the SNR information may not be completely reflective of success rate. Therefore, in one embodiment, the table could also include an historical success rate such that if the actual success rate is better than that associated with the calculated SNR, then the table could recommend that a higher rate (i.e. more complex modulation and coding scheme) be used. In contrast, if the actual success rate is worse than that associated with the calculated SNR, then the table could recommend that a lower rate (i.e. less complex modulation and coding scheme) be used.

Figure 4A:
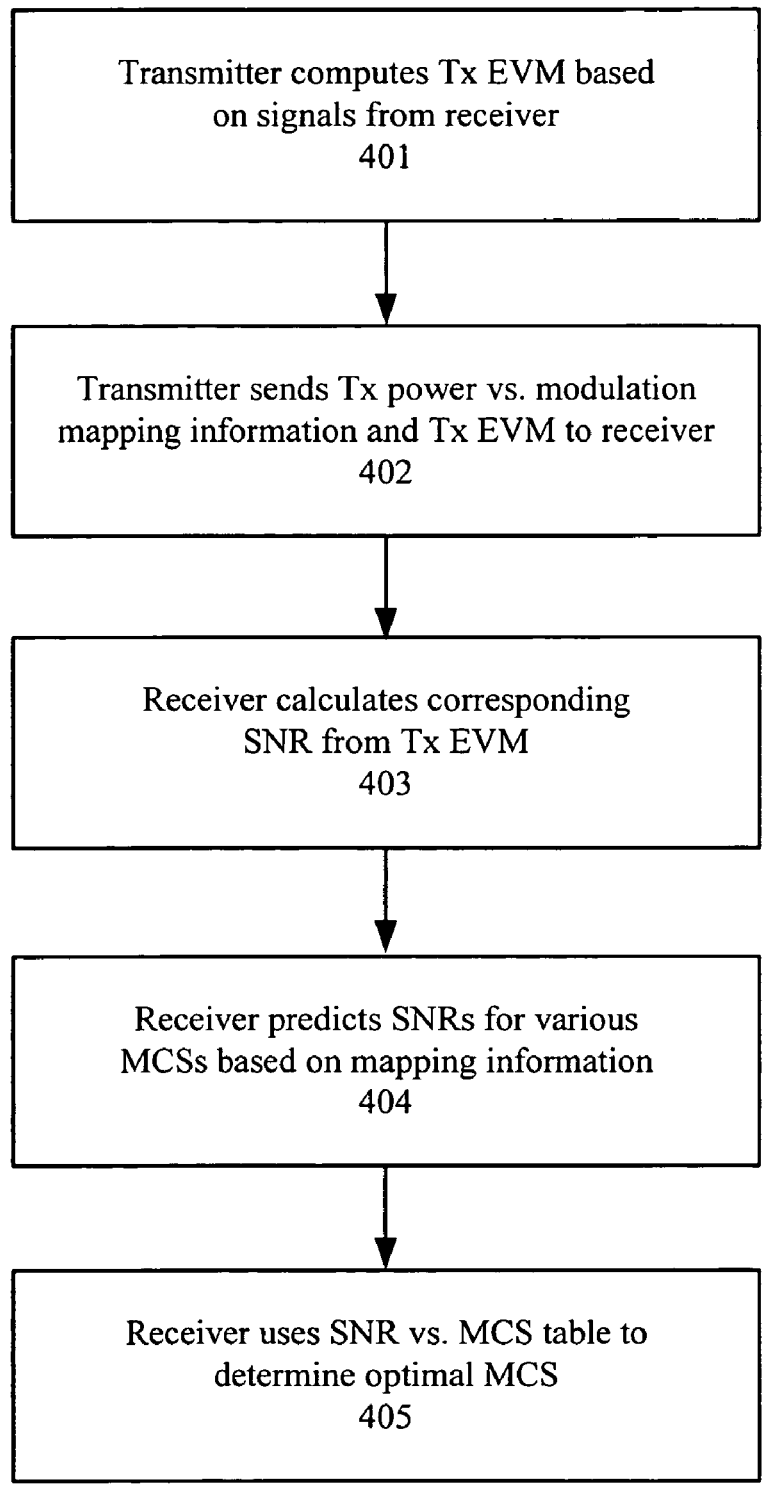
FIG. 4A illustrates another exemplary technique for the receiver to optimize a determination of the MCS.

In one embodiment, channel symmetry can be used to concentrate the more complex computations in the transmitter. In this technique 400 shown in FIG. 4A, the transmitter computes an EVM per stream based on its last received communication from the receiver (which should be commensurate with the EVM per stream computed at the receiver) in step 401. In step 402, the transmitter can send this transmitter-calculated EVM (Tx EVM) and generic transmitter power vs. modulation mapping information to the receiver in step 402. In step 403, the receiver can calculate the corresponding SNR from the Tx EVM. Note that this SNR calculation requires significantly fewer computation resources than the EVM calculation. In step 404 and using the computed SNR, the receiver can then predict the SNRs for various MCSs based on the transmit power vs. modulation information. In step 405, the receiver can use the SNR vs. MCS table to determine the optimized MCS. At this point, the receiver can send the MCS to the transmitter. Technique 400 is particularly advantageous where the receiver is implemented in a device having limited space or computational resources, e.g. a laptop computer.

FIG. 4B illustrates an exemplary SNR vs. MCS table 410 that could be used in step 405. In one embodiment, table 410 can be generated using simulations or lab bench measurements. Note the first MCS in table 410 refers to a single stream and the second MCS refers to dual streams (for example, MCS0 refers to a single stream and MCS8 refers to dual streams). In one embodiment, the SNR for the dual stream is the minimum of the two SNRs, i.e. one SNR for each stream.

Notably, for each MCS there is an associated SNR that can be used to reliably decode that MCS (and thus can be considered a sensitivity per MCS). After step 404 (FIG. 4A) in which the receiver predicts SNRs for various MCS, the receiver can in step 405 look up the SNR vs. MCS table, e.g. SNR vs. MCS table 410 (FIG. 4B), to see if the predicted SNRs are above the required SNRs and then pick the highest rate that meets the requirement. Note that table 410 can also indicate the number of streams.

Figure 5:
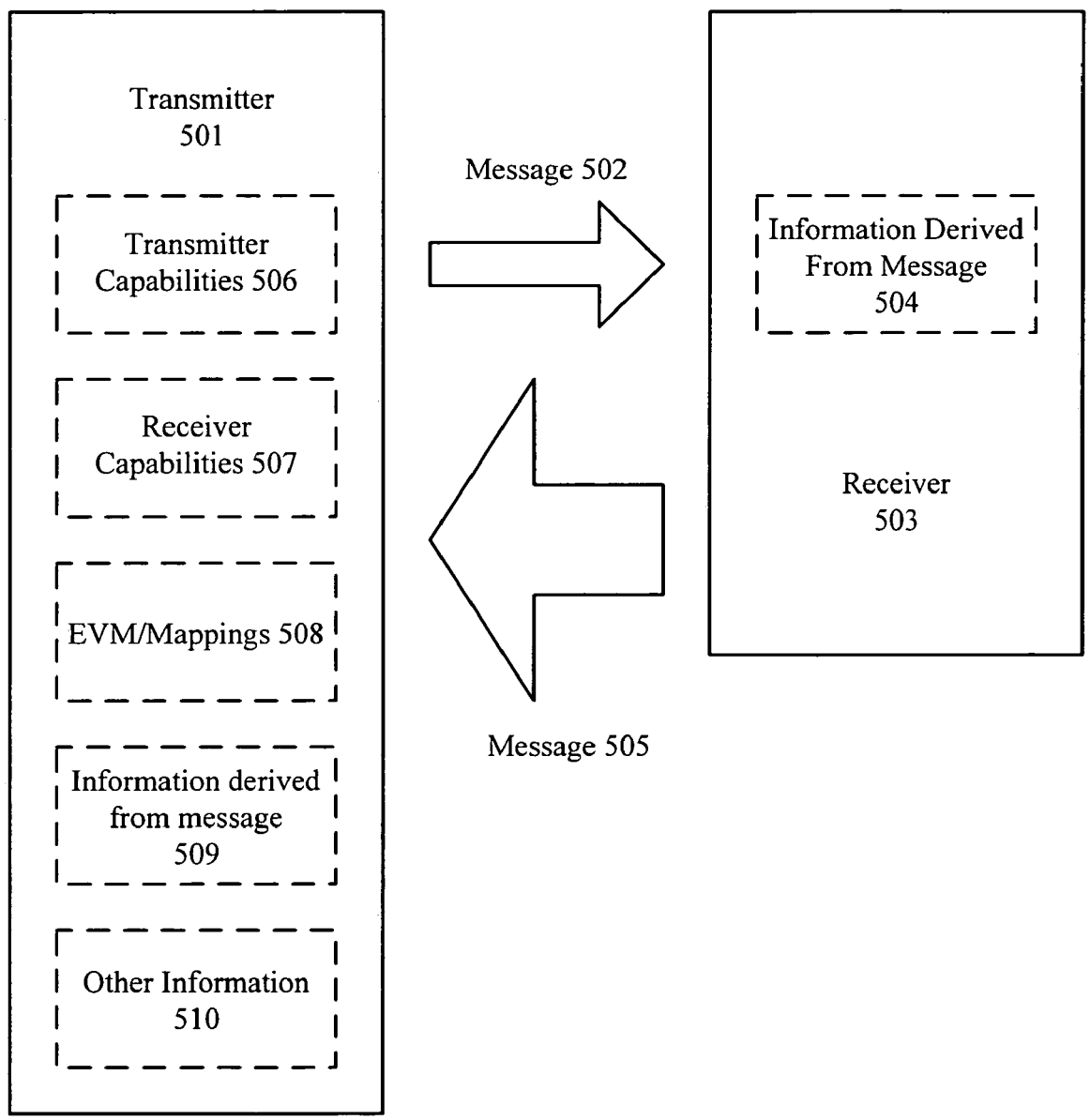
FIG. 5 illustrates a simplified wireless system in which a transmitter can generate an optimized MCS for itself.

FIG. 5 illustrates a simplified wireless system 500 in which a transmitter 501 can select an optimized MCS for itself. In system 500, transmitter 501 can send a message 502 to receiver 503. Receiver 503 can derive information 504 from message 502, e.g. the RSSI and EVM per stream. Receiver 503 can then send the EVM information as well as mapping information 508 (discussed below) to transmitter 501 via a message 505. Additionally, receiver 503 can also send receiver capabilities 504, e.g. usable data rates, in message 505. Note that messages 502 and 505 can include one or more command and/or data packets. After receiving message 505, transmitter 501 can use the EVM/mapping 508, receiver capabilities 507, its own transmitter capabilities 506 and derived information 509 (e.g. EVM), and other information 510 (e.g. interferences in the environment) to determine the appropriate MCS for itself under the circumstance.

Figure 6:
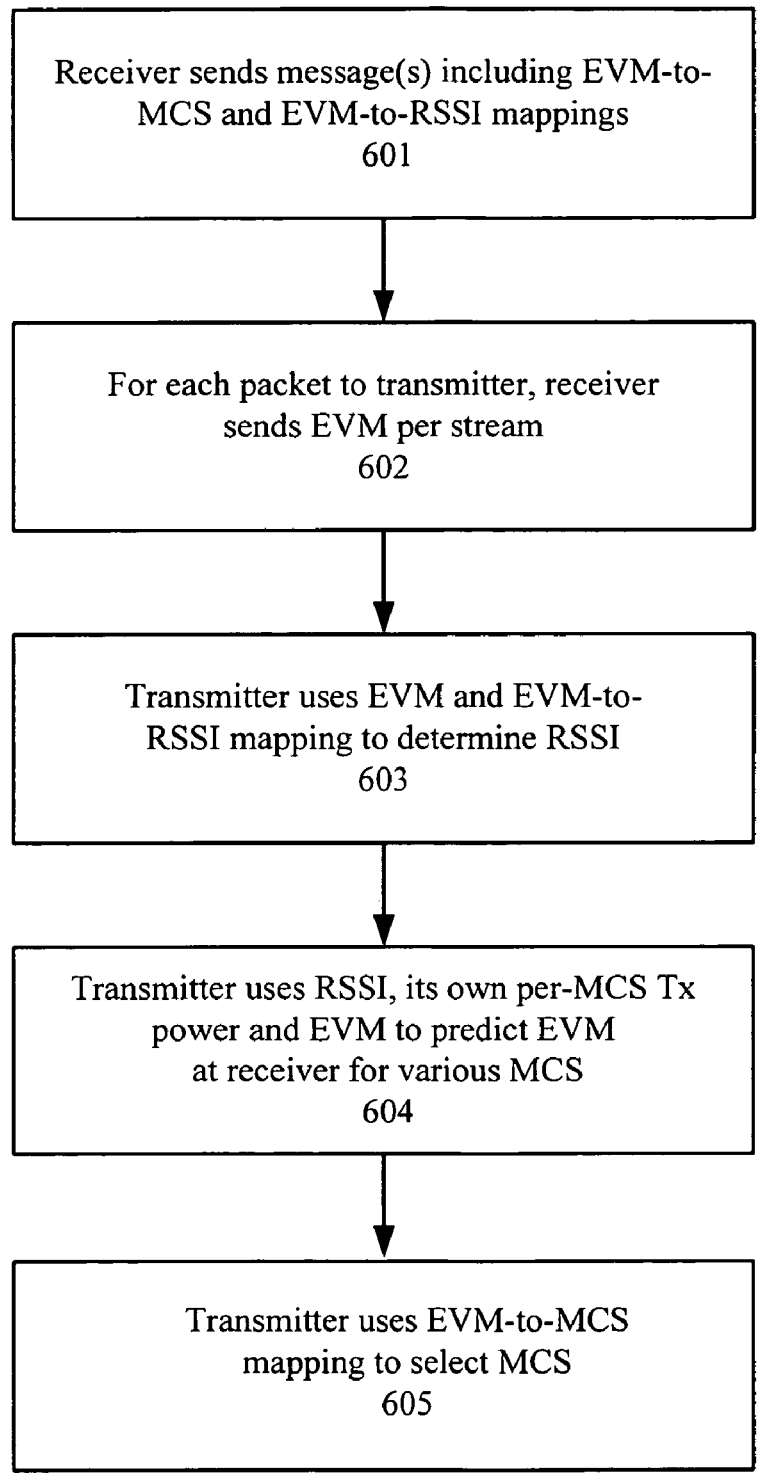
FIG. 6 illustrates an exemplary technique for the transmitter to determine its own MCS.

FIG. 6 illustrates an exemplary technique 600 for the transmitter to determine its own MCS. In step 601, the receiver can send the transmitter a message (e.g. message 505) including generic mapping information, i.e. EVM-to-MCS mapping information and EVM-to-RSSI mapping information. In one embodiment, this generic mapping information can be sent at the time of association, and may optionally be updated at subsequent times based on historical information tracked by the receiver.

In step 602, for each packet received from the transmitter, the receiver also sends back the EVM per stream. The transmitter uses this information and the EVM-to-RSSI mapping to calculate the RSSI at the receiver in step 603. This RSSI, together with its own transmit power and computed EVM, allows the transmitter to predict the EVM at the receiver for various MCS in step 604. Then, in step 605, the transmitter can use the receiver EVM-to-MCS mapping to select the optimized MCS to use.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. For example, note that the techniques described in FIGS. 3 and 4 are equally applicable to multicast messages wherein the transmitter can periodically send the information to several receivers. Further note that the above-described steps can be implemented using computer implemented instructions included in the receiver or transmitter.

In one embodiment, the average EVM (averaged over all bins) can be used for MCS selection. In another embodiment, an EVM per bin per stream can be used for MCS selection. Note that interference information (e.g. forming part of other information 207/510 (FIGS. 2 and 5)) can be reflected in the EVM.

In one embodiment, the transmitter can initially, and after some time of inactivity, send a frame using a robust MCS as a probe, and then using the feedback information quickly to determine to the appropriate MCS to use. That is, without the benefit of the above-described messages that can transmit various types of information, the transmitter can resort to probes to illicit some feedback. If the transmitter fails to receive the feedback, it can select a more robust MCS for subsequent transmissions. However, if the transmitter determines that the loss of feedback is due to collision with another frame, the transmitter may choose not to lower the MCS. Similarly, the transmitter can occasionally send more data streams than it has been sending with a robust modulation and coding scheme and get a more complete EVM per stream information for MCS selection.

In one embodiment, instead of determining the number of streams based on the SNR vs. MCS table, the number of streams can based on EVM per stream. For example, if the EVMs for two streams are similar and small, then dual streams at the same rate can be used. In contrast, if the EVM of one stream is smaller [HOW MUCH?] than the other, then dual streams at difference rates can be used. If the EVM of the second stream is very large, then a single stream can be used.

Note that all techniques described above can be advantageously provided in software using computer-implementable instructions. In one embodiment, these instructions can reside on a computer-readable medium.

Accordingly, it is intended that the scope of the invention be defined by the following Claims and their equivalents.

The invention claimed is:

1. A method for a receiver in a wireless multiple-input multiple-output (MIMO) system to optimize a determination of a number of streams, modulation, and coding rate scheme (MCS) for a transmitter in the wireless MIMO system, the method comprising:
receiving transmitter power vs. modulation mapping information from the transmitter in a message, each transmit power for a given modulation able to minimize distortion;
computing an error vector magnitude (EVM) from the message;
using the EVM to calculate a signal to noise ratio (SNR);
predicting SNRs for various MCSs based on the SNR and the transmitter power vs. modulation mapping information, thereby building an SNR vs. MCS table; and
determining an optimized MCS for the transmitter using the SNR vs. MCS table.

2. The method of claim 1, wherein the SNR vs. MCS table is dynamically adjustable.

3. The method of claim 2, wherein the SNR vs. MCS table includes historical success rates based on SNRs.

4. A method for a receiver in a wireless multiple-input multiple-output (MIMO) system to optimize a determination of a number of streams, a modulation, and coding rate scheme (MCS) for a transmitter in the wireless MIMO system, the method comprising:
receiving transmitter power vs. modulation mapping information from the transmitter in a message, each selected transmit power for a given modulation able to minimize distortion;
receiving an error vector magnitude (EVM) computed by the transmitter and sent in the message;
using the EVM to calculate a signal to noise ratio (SNR);
predicting SNRs for various MCSs based on the SNR and the transmitter power vs. modulation mapping information, thereby building an SNR vs. MCS table; and
determining an optimized MCS for the transmitter using the SNR vs. MCS table.

5. The method of claim 4, wherein the SNR vs. MCS table is dynamically adjustable.

6. The method of claim 5, wherein the SNR vs. MCS table includes historical success rates based on SNRs.

7. A method for a transmitter in a wireless system to optimize a determination of a modulation and coding rate scheme (MCS) for itself in the wireless system, the method comprising:
receiving generic mapping information from the receiver in a message, the generic mapping information including an EVM-to-MCS mapping and an EVM-to-RSSI mapping;
receiving an error vector magnitude (EVM) per stream from the receiver in the message;
using the EVM and the EVM-to-RSSI mapping to calculate an RSSI at the receiver;
using the RSSI and a selected power of the transmitter to predict EVMs at the receiver for various MCSs; and
using the EVM-to-MCS mapping to select an optimized MCS for itself.

8. A receiver in a wireless system, the receiver being capable of optimizing a determination of a number of streams, modulation, and coding rate scheme (MCS) for a transmitter in the wireless system, the receiver including software with computer-implementable instructions, the receiver comprising:
instructions for receiving a message from the transmitter, the message including transmitter power vs. modulation mapping information;
instructions for computing an error vector magnitude (EVM) from the message;
instructions for using the EVM to calculate a signal to noise ratio (SNR);
instructions for predicting SNRs for various MCSs based on the SNR and the transmitter power vs. modulation mapping information, thereby building an SNR vs. MCS table and
instructions for determining an optimized MCS for the transmitter using the SNR vs. MCS table.

9. The receiver of claim 8, further including instructions for dynamically adjusting the SNR vs. MCS table.

10. The receiver of claim 8, further including instructions for dynamically adjusting the SNR vs. MCS table using historical success rates based on SNRs.

11. A receiver in a wireless system, the receiver being capable of optimizing a determination of a number of streams, a modulation, and coding rate scheme (MCS) for a transmitter in the wireless system, the receiver including software with computer-implementable instructions, the receiver comprising:
instructions for receiving a message from the transmitter, the message including transmitter power vs. modulation mapping information;
instructions for receiving an error vector magnitude (EVM) per stream computed by the transmitter and sent in the message;
instructions for using the EVM to calculate a signal to noise ratio (SNR);
instructions for predicting SNRs for various MCSs based on the SNR and the transmitter power vs. modulation mapping information, thereby building an SNR vs. MCS table; and
instructions for determining an optimized MCS for the transmitter using the SNR vs. MCS table.

12. The receiver of claim 11, further including instructions for dynamically adjusting the SNR vs. MCS table.

13. The receiver of claim 12, further including instructions for dynamically adjusting the SNR vs. MCS table using historical success rates based on SNRs.

14. A transmitter in a wireless system, the transmitter being capable of optimizing a determination of a number of streams, a modulation, and coding rate scheme (MCS) for itself in the wireless system, the transmitter including software with computer-implementable instructions, the transmitter comprising:

instructions for receiving generic mapping information in a message from a receiver in the wireless system, the generic mapping information including an EVM-to-MCS mapping and an EVM-to-RSSI mapping;

instructions for receiving an error vector magnitude (EVM) per stream from the receiver in the message;

instructions for using the EVM and the EVM-to-RSSI mapping to calculate an RSSI at the receiver;

instructions for using the RSSI and a selected power of the transmitter to predict EVMs at the receiver for various MCSs; and instructions for using the EVM-to-MCS mapping to select an optimized MCS for the transmitter.

15. The transmitter of claim 14, wherein the instructions for using the RSSI and the selected power includes instructions for building an EVM-to-MCS table based on one entry.

* * * * *